United States Patent
Moser

[11] Patent Number: 6,045,766
[45] Date of Patent: Apr. 4, 2000

[54] PROCESS FOR REDUCING RESIDUAL HYDROGEN FLUORIDE GASES IN A FLUORINATED PLASTIC TANK

[75] Inventor: Rainer Moser, Idstein, Germany

[73] Assignee: Mannesmann VDO AG, Frankfurt am Main, Germany

[21] Appl. No.: 09/312,173

[22] Filed: May 14, 1999

[30] Foreign Application Priority Data

May 16, 1998 [DE] Germany ............. 198 22 151

[51] Int. Cl.⁷ ............. C01B 7/19; B01D 53/14; B05D 7/22
[52] U.S. Cl. ............. 423/240 R; 95/151; 427/230; 427/237
[58] Field of Search ............. 423/240 R; 95/149, 95/151; 427/255.1, 237

[56] References Cited

U.S. PATENT DOCUMENTS 4,994,308   2/1991   Tarancon .

FOREIGN PATENT DOCUMENTS 0816418   1/1998   European Pat. Off. .

OTHER PUBLICATIONS

Merriam–Webster's Collegiate Dictionary, 1999, p. 1134.
VDI–Verlag GmbH, "Sperrschicht–bildung bei Kunststoff–Hohlkörpern," pp. 117–130 (1986).

*Primary Examiner*—Steven P. Griffin
*Assistant Examiner*—Elin Warn
*Attorney, Agent, or Firm*—Mayer, Brown & Platt

[57] ABSTRACT

The invention relates to a process for reducing the residual hydrogen fluoride gases in a fluorinated plastic tank, in particular in a plastic tank for a motor vehicle, in which firstly the space within the tank is subjected to a fluorination step and then, in at least one gas flushing process, the reaction products of the fluorination step are removed from the plastic tank. In a process in which the undesired reaction product hydrogen fluoride is completely eliminated and which is suitable for efficient large-scale production, after the gas flushing process, a neutralization step is carried out to bind residual fluorination gases on the inner layers of the plastic tank.

11 Claims, 1 Drawing Sheet

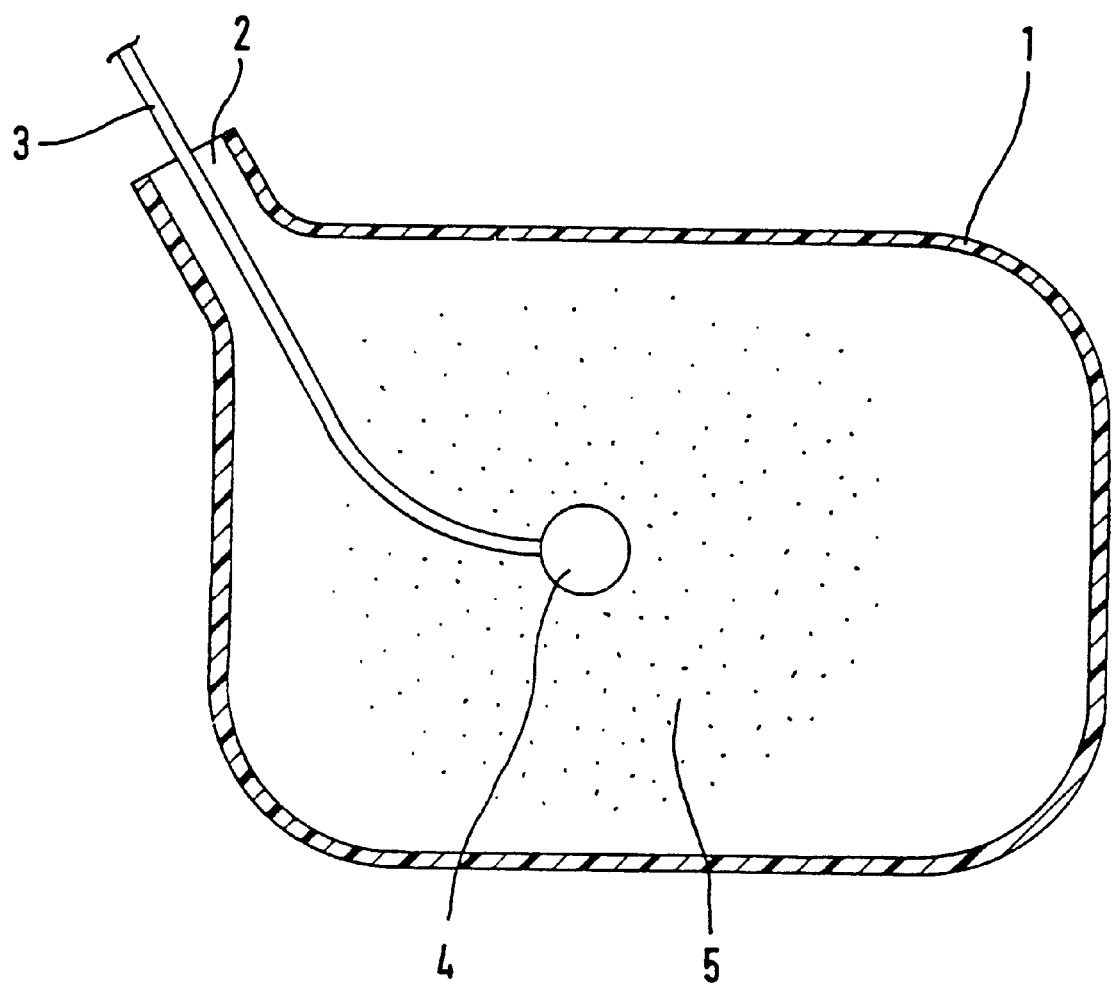

PROCESS FOR REDUCING RESIDUAL HYDROGEN FLUORIDE GASES IN A FLUORINATED PLASTIC TANK

BACKGROUND OF THE INVENTION

1. Field of the Invention

The invention relates to a process for reducing the residual hydrogen fluoride gases in a fluorinated plastic tank, in particular in a plastic tank for a motor vehicle, in which firstly the space within the tank is subjected to a fluorination step and then, in at least one gas flushing process, the reaction products of the fluorination step are removed from the plastic tank.

2. Description of Related Art

For fuel tanks, attention has recently been given to removing any possibility of fuel vapor escaping from the fuel tank into the environment. The escape of fuel vapor is disadvantageous for the user of the motor vehicle and also causes pollution.

Plastic fuel tanks are fluorinated on the inner side of the tank to achieve increased resistance to permeation of the fuel medium. This surface reaction with elemental fluorine gives hydrogen fluoride as an undesired reaction product.

The excess gas from the fluorine reaction and the hydrogen fluoride are therefore removed by suction after the process. The plastic tank is then additionally flushed with dry nitrogen or dry air in a gas flushing process to remove reaction products which have remained in the plastic tank.

Despite these measures, residual amounts of hydrogen fluoride remain in the tank, and this has an adverse effect on components subsequently incorporated into the tank, such as level indicators and feed units. Depending on how much residual hydrogen fluoride gas is still present in the atmosphere in the tank, the metal surfaces or the glassy surfaces of the level indicator and feed units become etched to some extent by the residual hydrogen fluoride. Incipient damage of this type causes premature failure of the potentiometers built into the level indicator and therefore of the entire level indicator.

The objective on which the invention is based is therefore to provide a process in which the undesired reaction product hydrogen fluoride is completely eliminated and which on examination is found to be suitable for large-scale production.

SUMMARY OF THE INVENTION

The purpose and advantages of the invention will be set forth in and apparent from the description and drawing that follow, as well as will be learned by practice of the invention. Additional advantages of the invention will be realized and attained by the elements of the method particularly pointed out in the appended claims.

According to the invention, the objective is achieved by carrying out, after the gas flushing process, a neutralization step to bind residual fluorination gases on the inner layers of the plastic tank.

The advantage of the invention is that this simple measure gives immediate reactive binding of the residual hydrogen fluoride gas to the inner surface of the tank and suppresses emission into the space within the tank. There is no need for repeated flushing over many hours with dry nitrogen or with dry air or aeration of the fluorinated plastic tank for a number of days. This process is therefore particularly suitable for large-scale production.

Even in applications where there are particularly severe permeation requirements (superfluorination), this process reliably suppresses the emission of the residual gas.

In one embodiment a liquid neutralizing agent comprising the component reactive to hydrogen fluoride is shaken in the space within the tank during the neutralization step.

This results in wetting of the entire inner surface of the tank by the neutralizing agent.

As an alternative to this, the high-boiling neutralizing agent comprising the component reactive to hydrogen fluoride is atomized in the space within the tank during the neutralization step.

This type of atomization results in absorption of the hydrogen fluoride in the gas space of the plastic tank.

The condensed neutralizing agent also brings about substantial wetting of the inner layers of the tank by droplets of the solution of the active substance. Any hydrogen fluoride subsequently desorbing from the inner surface of the tank is immediately bound by a reaction at the inner surface of the tank and held there.

The proportion of the reactive component in the neutralizing agent is advantageously from 0.1 to 50%.

If a basic reactive component is used, the binding of the hydrogen fluoride takes place via an acid-base reaction.

In this case it is advantageous to use acid-neutralizing oil additives or acid-neutralizing fuel additives or an organic base, such as amines.

The use of low-odor white spirit or of a highly refined spirit as the solvent in the neutralizing agent ensures the neutrality of this agent with respect to the components to be incorporated, such as level indicators and feed units. Another solvent suitable because of its high flashpoint is engine oil (preferably synthetic oil).

The suppression of emissions of any gases hazardous to health in the plastic tank at the same time enables secondary incorporation of level indicators and feed units at a later stage.

As an alternative to this, the neutralizing agent may be introduced into the space within the tank in the form of vapor or fine spray mist of the pure reactive component (e.g. pure oil additive) during the neutralization step.

In one embodiment of the invention residual fluorine is measured, for example using an HF gas warning device, after the neutralization step. For this, the atmosphere within the tank is checked for residual fluorine using a selective mass-spectroscopic method or an amperometric cell, to determine whether a sufficient amount of the reactive component is present.

On-line measurement using a selective mass-spectroscopic method can be used to check whether there has been adequate atomization of the neutralizing agent in the space within the tank, i.e. whether the hydrogen fluoride initially present in the gas space has been bound by reaction.

It is to be understood that both the foregoing general description and the following detailed description are exemplary and provided for purposes of explanation only, and are not restrictive of the invention, as claimed.

BRIEF DESCRIPTION OF THE DRAWINGS

The accompanying drawing, which is incorporated in and constitutes a part of this specification, is useful for illustrating a preferred embodiment of the invention and, together with the description, serves to explain the principles of the invention.

The FIGURE is a perspective view of a plastic fuel tank 1 made from HDPE (high-density polyethylene) and designed to carry gasoline.

DETAILED DESCRIPTION OF THE INVENTION

After the plastic fuel tank 1 has been produced its inner side is fluorinated to achieve high resistance to permeation of the gasoline medium, by introducing fluorine gas diluted with nitrogen into the gas space of the fuel tank 1 via the opening 2 of the tank 1. The reaction of the surface of the plastic with the elemental fluorine gives hydrogen fluoride as reaction product:

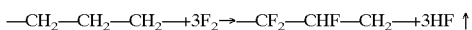

The excess $F_2$ reaction gas, and also the hydrogen fluoride HF, are removed by suction after the fluorination step.

After the fluorination step and the removal by suction, a conventional gas flushing process is used to flush the fuel tank 1 with dry nitrogen or with dry air.

A high-boiling solvent 5 which comprises a sufficient amount of a reactive component suitable for binding hydrogen fluoride is then sprayed into the space within the tank with the aid of a pressurized atomizing spray head 4, as shown in FIG. 1, introduced into the fuel tank 1 on a rod 3. The pressurized spray head 4 here is constructed in such a way that the fine mist which it sprays reaches all areas uniformly in the space within the tank. Suitable equipment includes conventional paint-spraying guns (from 6 to 8 bar compressed air) which give good spraying in particular of viscous solutions.

The atomization results in absorption of hydrogen fluoride from the gas space, and also substantial wetting of the inner surface with droplets of the active substance. Any hydrogen fluoride subsequently desorbed is immediately bound by a reaction at the inner surface of the tank, thus suppressing escape of gas into the space within the tank.

A preferred solvent is a high-boiling, low-odor white spirit or a highly refined spirit. Commercially available synthetic engine oil of 5W-50 and/or 10W-40 grade is also suitable due to its low volatility and low combustibility.

Triethylamine ($Et_3NH^+F^-$) forms well known adducts with hydrogen fluoride. For cost reasons the amount of the active solution used is only small, from 3 to 50 ml, but this is sufficient to neutralize the residual amount of hydrogen fluoride remaining in the tank after the gas flushing.

EXAMPLES

1. The white spirit (proportion 98% by volume) here is an aliphatic hydrocarbon mixture (C11–C13) with addition of 2% by volume of oil additive with the active substances polyisobutylene succinimide and polyamine, TBN value=21 (equivalent to mg KOH/g) with an amount of from 50 to 100 ml introduced by spraying.

2. Another possible composition is 99.8% of white spirit+ 0.2% of triethylamine. Again an amount of from 50 to 100 ml is introduced by spraying.

3. The following mix is also suitable: synthetic engine oil of 5W-50 grade+20% by weight of oil additive with the following active substance: diphenylamine in oil, TBN value=120. This mix is particularly low in odor. An amount of from 3 to 8 ml is introduced by spraying (paint-spraying gun).

4. The following mixture is also effective: synthetic engine oil of 10W-40 grade+10% by weight of n-tributylamine. An amount of from 3 to 8 ml is introduced by spraying.

Reaction example:

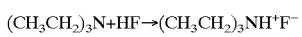

To check the success of hydrogen fluoride removal from the atmosphere in the tank, after the neutralization step is complete, a selective mass-spectroscopic method or an amperometric HF sensor is used to analyze this atmosphere for residual fluorine. As an alternative to this, a laboratory method may be used to check the effectiveness of the process simply by spot test (e.g. by removing a defined amount of the atmosphere in the tank, absorption in aqueous alkali and measurement with a fluorine-selective electrode and/or using ion chromatography). Spot checks with gas-testing tubes (Gastec, Fukaya, Japan) with a measuring range of from 0.25 to 100 ppm of HF are also to be recommended.

Both methods reveal whether a sufficient amount of the reactive component was present, and/or it is also possible to determine whether the atomization of the solvent was satisfactory.

In all four examples given, the use of the process was successful, i.e. the HF concentration in the atmosphere in the tank (typical range from 10 to 50 ppm) could be reduced in the space within the tank to values of less than 0.2 ppm.

Other embodiments of the invention will be apparent to those skilled in the art from consideration of the specification and practice of the invention disclosed herein. It is intended that the specification and examples of embodiments be considered as exemplary only, with the true scope and spirit of the invention being indicated by the following claims.

What is claimed is:

1. A process for reducing the residual hydrogen fluoride gases in a fluorinated plastic tank, comprising the steps of:

fluorinating a plastic tank;

flushing the plastic tank with at least one gas to remove the reaction products of the fluorination step; and binding the residual fluorination gases inside the plastic tank with a neutralizing agent.

2. A process as claimed in claim 1, wherein the binding step further comprises shaking the neutralizing agent within the inside of the plastic tank.

3. A process as claimed in claim 1, wherein the binding step further comprises atomizing the neutralizing agent within the inside of the plastic tank.

4. A process as claimed in claim 1, wherein the neutralizing agent is comprised of from about 0.1 to about 5% of a reactive component.

5. A process as claimed in claim 4, wherein the reactive component binds the residual fluorination gases by an acid-base reaction.

6. A process as claimed in claim 5, wherein the reactive component is selected from an acid-neutralizing oil additive, an acid-neutralizing fuel additive, and an organic base.

7. A process as claimed in claim 1, wherein the neutralizing agent comprises an engine oil.

8. A process as claimed in claim 1, wherein the neutralizing agent is selected from a low-odor white spirit and a highly refined spirit.

9. A process for reducing the residual hydrogen fluoride gases in a fluorinated plastic tank, comprising the steps of:

fluorinating a plastic tank;

flushing the plastic tank with at least one gas to remove the reaction products of the fluorination step; and introducing a neutralizing agent in the form of a vapor or fine spray mist into the plastic tank.

10. A process for reducing the residual hydrogen fluoride gases in a fluorinated plastic tank, comprising the steps of:

fluorinating a plastic tank;

flushing the plastic tank with at least one gas to remove the reaction products of the fluorination step;

binding the residual fluorination gases inside the plastic tank with a neutralizing agent; and measuring the residual fluorine.

11. A process as claimed in claim 10, wherein the measuring step further comprises measuring the residual fluorine on-line for indirect checking of the neutralizing agent in the plastic tank.

* * * * *